United States Patent
Kubota

(10) Patent No.: US 11,599,618 B2
(45) Date of Patent: Mar. 7, 2023

(54) USER AUTHENTICATION DEVICE AND IMAGE FORMING DEVICE

(71) Applicant: SHARP KABUSHIKI KAISHA, Sakai (JP)

(72) Inventor: Kazuhisa Kubota, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 163 days.

(21) Appl. No.: 16/659,121

(22) Filed: Oct. 21, 2019

(65) Prior Publication Data

US 2020/0125714 A1    Apr. 23, 2020

(30) Foreign Application Priority Data

Oct. 23, 2018  (JP) ............................ JP2018-199237

(51) Int. Cl.
  G06F 21/34    (2013.01)
  G06F 21/36    (2013.01)
  G06F 21/40    (2013.01)

(52) U.S. Cl.
  CPC ............. *G06F 21/34* (2013.01); *G06F 21/36* (2013.01); *G06F 21/40* (2013.01)

(58) Field of Classification Search
  CPC .......... G06F 21/34; G06F 21/36; G06F 21/40; G06F 21/45; G06F 21/608; H04N 1/4406
  See application file for complete search history.

(56) References Cited

U.S. PATENT DOCUMENTS

| | | | | |
|---|---|---|---|---|
| 2005/0259976 A1* | 11/2005 | Shimoda | ............... | G11B 27/034 386/243 |
| 2006/0242691 A1* | 10/2006 | Meister | ................. | G06Q 20/341 726/9 |
| 2008/0026723 A1* | 1/2008 | Han | ....................... | H04M 1/663 455/410 |
| 2011/0197074 A1 | 8/2011 | Foley et al. | | |
| 2011/0228311 A1* | 9/2011 | Oguma | ................. | G06F 21/305 358/1.14 |
| 2014/0310767 A1* | 10/2014 | Nishimura | .............. | H04L 63/20 726/1 |
| 2015/0324675 A1* | 11/2015 | Morii | ................. | G06K 15/4095 358/1.14 |

FOREIGN PATENT DOCUMENTS

| | | |
|---|---|---|
| CN | 102195961 A | 9/2011 |
| CN | 107612880 A | 1/2018 |
| JP | 2006504167 A | 2/2006 |
| JP | 2014105501 A | 6/2014 |
| JP | 2015-227048 A | 12/2015 |
| JP | 2018142928 A | 9/2018 |

* cited by examiner

*Primary Examiner* — Daniel B Potratz

(74) *Attorney, Agent, or Firm* — ScienBiziP, P.C.

(57) ABSTRACT

A user authentication device includes a user authentication setter that enables or disables a predetermined plurality of authentication methods, and a user authenticator that accepts user authentication by the authentication method that the user authentication setter enables, and a controller that controls the user authentication setter and the user authenticator. When the user authentication setter accepts a setting that enables a single authentication method among the plurality of authentication methods, the controller controls the user authentication setter to disable all authentication methods other than the single authentication method, and the user authenticator accepts only user authentication by the single authentication method.

8 Claims, 13 Drawing Sheets

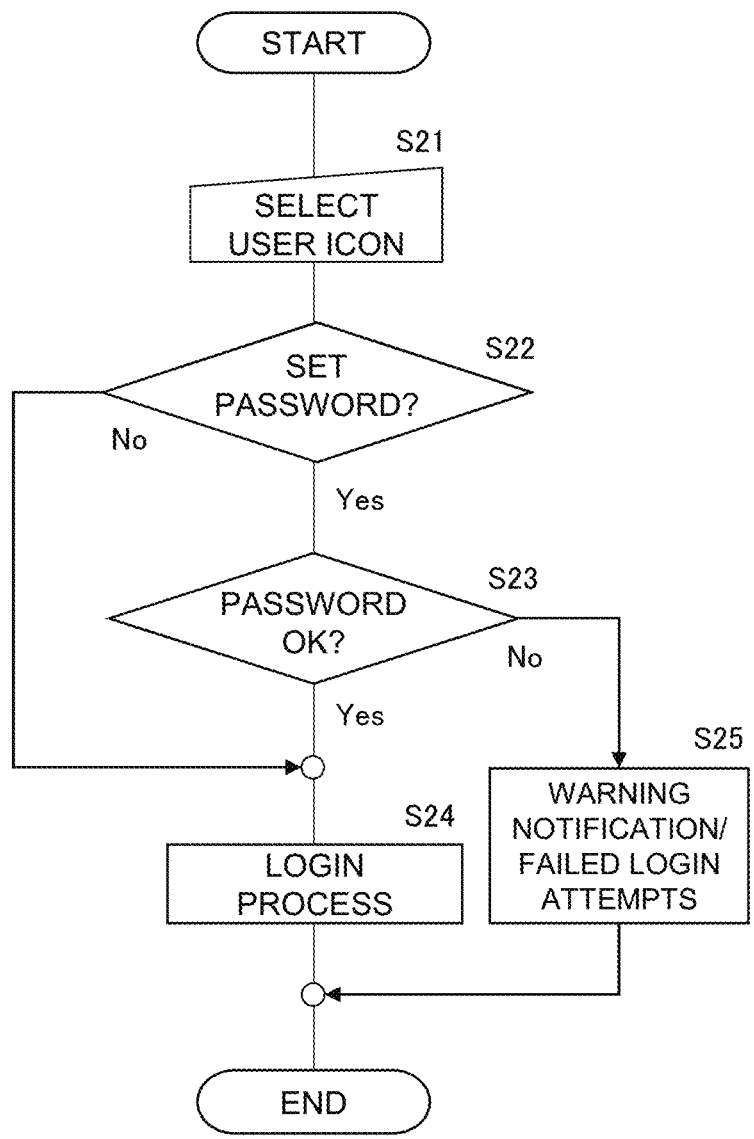

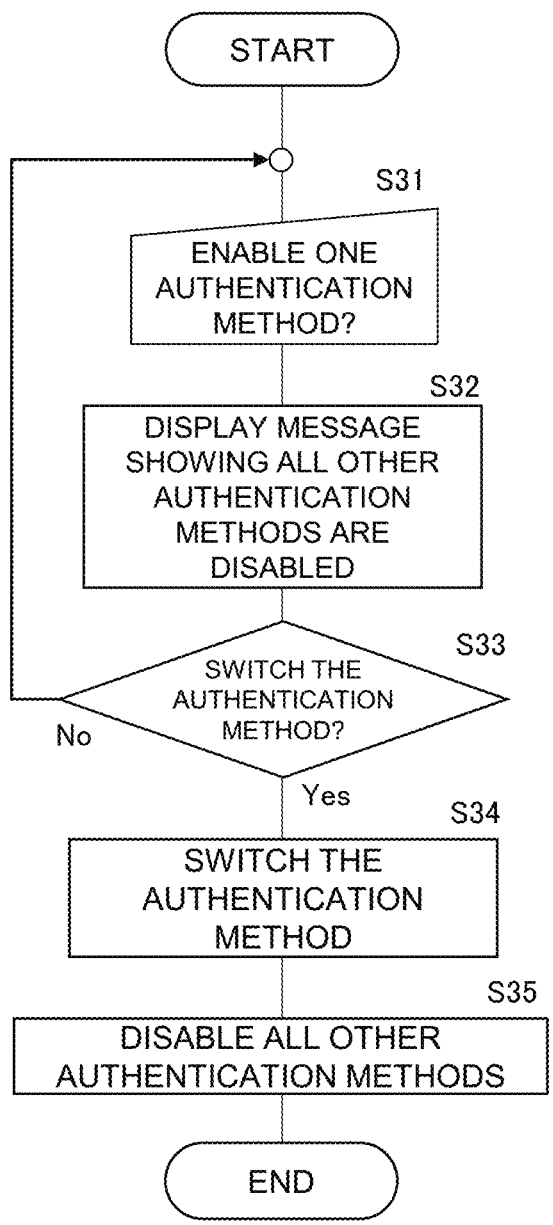

FIG. 9

| AUTHENTICATION METHOD | AUTHENTICATION NAME | INPUT | ENABLE/ DISABLE |
|---|---|---|---|
| AUTHENTICATION METHOD 1 | QUICK AUTHENTICATION | SELECT ICON IMAGE (ALSO ENTER PASSWORD IF A PASSWORD HAS BEEN SET) | ENABLE |
| AUTHENTICATION METHOD 2 | LOGIN AUTHENTICATION | ENTER LOGIN NAME AND PASSWORD | DISABLE |
| AUTHENTICATION METHOD 3 | IC CARD AUTHENTICATION | INPUT THE IC CARD | DISABLE |
| AUTHENTICATION METHOD 4 | BIOMETRIC AUTHENTICATION | INPUT BIOMETRIC INFORMATION | DISABLE |

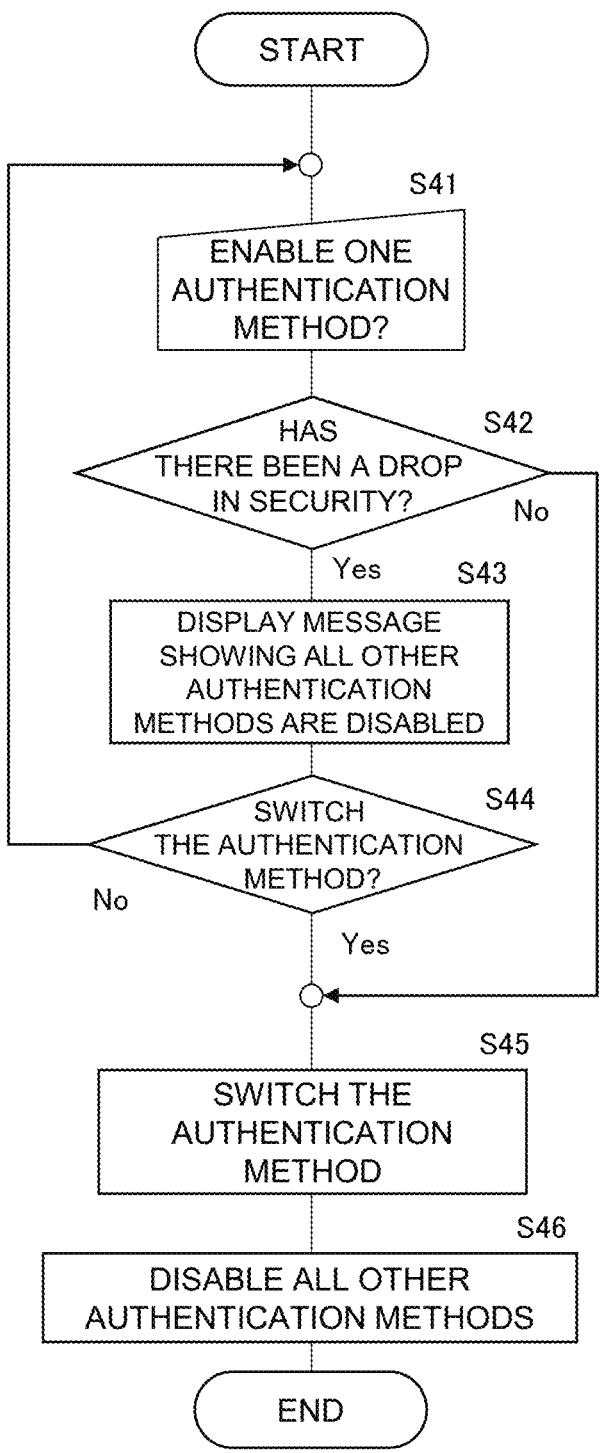

FIG. 11

| AUTHENTICATION METHOD | AUTHENTICATION NAME | INPUT | SECURITY LEVEL |
|---|---|---|---|
| AUTHENTICATION METHOD 1 | QUICK AUTHENTICATION | SELECT ICON IMAGE (ALSO ENTER PASSWORD IF A PASSWORD HAS BEEN SET) | 1 |
| AUTHENTICATION METHOD 2 | LOGIN AUTHENTICATION | ENTER LOGIN NAME AND PASSWORD | 2 |
| AUTHENTICATION METHOD 3 | IC CARD AUTHENTICATION | INPUT THE IC CARD | 3 |
| AUTHENTICATION METHOD 4 | BIOMETRIC AUTHENTICATION | INPUT BIOMETRIC INFORMATION | 4 |

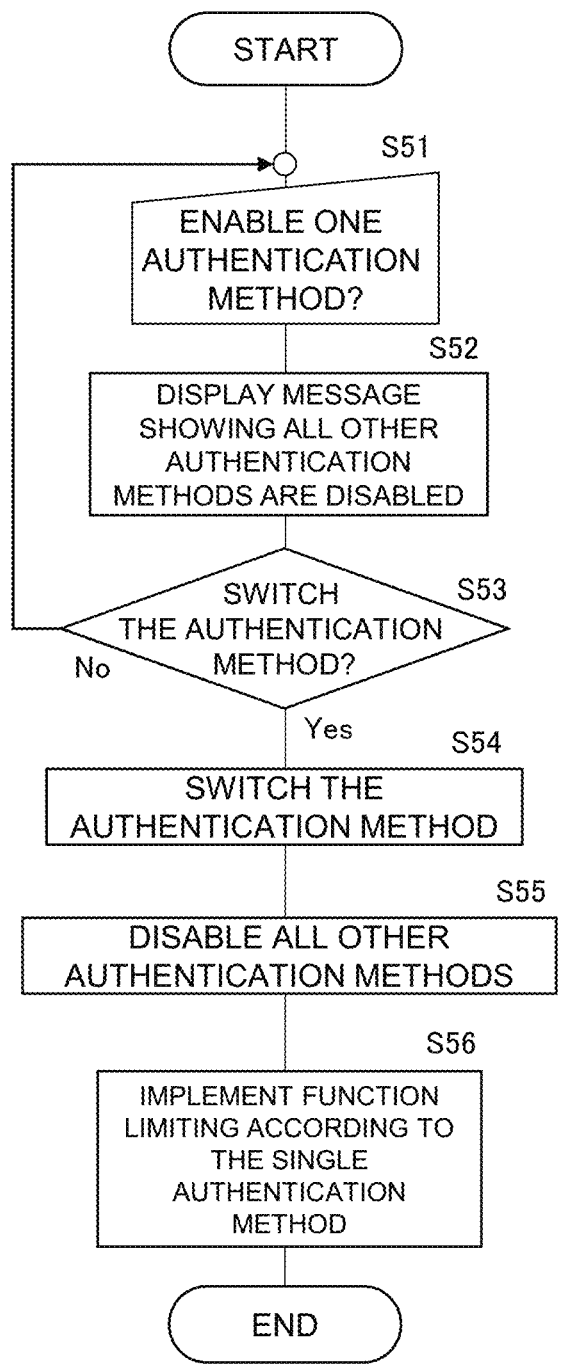

FIG. 13

| AUTHENTICATION METHOD | AUTHENTICATION NAME | INPUT | FUNCTION LIMITING |
|---|---|---|---|
| AUTHENTICATION METHOD 1 | QUICK AUTHENTICATION | SELECT ICON IMAGE (ALSO ENTER PASSWORD IF A PASSWORD HAS BEEN SET) | LIMIT THE NUMBER OF PRINTED SHEETS PROHIBIT COLOR PRINTING PROHIBIT USING OPTIONS |
| AUTHENTICATION METHOD 2 | LOGIN AUTHENTICATION | ENTER LOGIN NAME AND PASSWORD | PROHIBIT COLOR PRINTING PROHIBIT USING OPTIONS |
| AUTHENTICATION METHOD 3 | IC CARD AUTHENTICATION | INPUT THE IC CARD | PROHIBIT USING OPTIONS |
| AUTHENTICATION METHOD 4 | BIOMETRIC AUTHENTICATION | INPUT BIOMETRIC INFORMATION | NO FUNCTION LIMITING |

USER AUTHENTICATION DEVICE AND IMAGE FORMING DEVICE

BACKGROUND OF THE INVENTION

Field of the Invention

The present invention relates to a user authentication device and an image forming device, and relates in particular to a user authentication device including a plurality of authentication methods and an image forming device including the user authentication device.

Description of the Background Art

Various authentication methods such as IC card authentication, login authentication, and quick authentication are known as user authentication methods for electronic devices such as multi-function peripherals, personal computers, and smartphones.

As one of inventions relating to authentication methods for electronic devices capable of utilizing a plurality of such authentication methods, disclosed is an invention relating to an image forming device capable of dynamically switching the login process by applying user authentication that selects an icon (quick authentication), and user authentication that specifies a user by scanning a card (IC card authentication) (See for example, Japanese Unexamined Patent Application Publication No. 2015-227048).

However, items available to the user might be limited by the authentication method due to reasons such as confidentiality and security.

Also, different settings might be made even for the same user depending on the authentication method.

The problem therefore occurred that when a plurality of authentication methods are enabled on a single device, the user is frequently confused due to not knowing which authentication method is utilized for login and which item is available.

In view of the aforementioned problems, the present invention has the object of providing a user authentication device capable of reducing operating errors by the user when there are a plurality of authentication methods, and an image forming device including the user authentication device.

SUMMARY OF THE INVENTION (1) A user authentication device according to one aspect of the present invention includes a user authentication setter that enables or disables a predetermined plurality of authentication methods, a user authenticator that accepts user authentication by the authentication method that the user authentication setter enables, and a controller that controls the user authentication setter and the user authenticator. When the user authentication setter accepts a setting that enables a single authentication method among the plurality of authentication methods, the controller controls the user authentication setter to disable all authentication methods other than the single authentication method, and the user authenticator accepts only user authentication by the single authentication method.

The present invention is capable of achieving a user authentication device that reduces operating errors by the user when one of a plurality of authentication methods is enabled, because all authentication methods other than the single authentication method are automatically disabled so that only the single authentication method is accepted.

The preferred embodiments of the present invention are further hereinafter described.

(2) Another aspect of the user authentication device of the present invention may further include a display that displays switchably between user authentication screens relating to the plurality of authentication methods, and the controller may not display authentication screens relating to the authentication methods other than the single authentication method on the display.

In this way, the authentication methods other than the single authentication method not selected by the user are not displayed on the screen so that a user authentication device can be achieved that reduces operating errors by the user when there are a plurality of authentication methods.

(3) In another aspect of the user authentication device of the present invention, the plurality of authentication methods may include an optional combination of inputs from among an input relating to selecting an icon image, an input of a login name, an input of a password, and an input of an IC card.

In the present invention, the "optional combination of inputs" may, for example, be an optional combination of inputs such as an input relating to selecting an icon image and an input of a password as the first authentication method, an input of a and an input of a password as a second authentication method, and an input of an IC card authentication as a third authentication method.

The input serving as the basis for the authentication may include an input of a biometric feature such as a fingerprint, a face, an iris, or a voiceprint.

A user authentication device can in this way be achieved that reduces user operating errors when there are a plurality of authentication methods of optional combinations of each input, including inputs relating to selecting icon images, inputs of login names, inputs of passwords, and inputs of IC cards.

(4) Another aspect of the user authentication device of the present invention may further include a user function limiter that applies limits, according to the authentication method, on functions that are available after the user authentication.

In the present invention, "applies limits according to the authentication method" is limiting the functions available to the user more than in the case of a normally used authentication method, when, for example, the user is authenticated by an authentication method with a lower security level, such as only by selecting an icon, than a normally used authentication method that requests entry of a login name and a password.

A user authentication device can in this way be achieved that reduces user operating errors when function limiting is applied according to the authentication method.

(5) In another aspect of the user authentication device of the present invention, the degree of a security level of each of the plurality of authentication methods may be determined beforehand, and when an input portion accepts an input to enable an authentication method with a security level lower than a currently enabled authentication method, the controller may display, on the display, a notification that a switch is made to an authentication method with a low security level.

A user authentication device can in this way be achieved that reduces user operating errors when there are a plurality of authentication methods by notifying the user that a switch is made to an authentication method with a low security level.

(6) In another aspect of the user authentication device of the present invention, when, after the display displays the notification that a switch is made to the authentication method with the low security level, the input portion accepts an input to approve the switching of the authentication method, the controller may also control the user authentication setter to enable the authentication method.

A user authentication device can in this way be achieved that reduces user operating errors when there are a plurality of authentication methods by notifying the user of a switch to an authentication method with a low security level and then switching to the authentication method with a low security level if the user approves switching the authentication method.

(7) An image forming device of an aspect of the invention may include: the user authentication device, an image processor that processes image data, and an image former that forms images based on the image data processed by the image processor.

An image forming device can in this way be achieved that reduces user operating errors when there are a plurality of authentication methods, by automatically disabling authentication methods other than the single authentication method selected by the user.

BRIEF DESCRIPTION OF THE DRAWINGS

FIG. 7 is a flowchart showing an example of the login process for quick authentication on the digital multi-function peripheral shown in FIG. 1;

FIG. 8 is a flowchart showing an example of the process when enabling a single authentication on the digital multi-function peripheral shown in FIG. 1;

FIG. 9 is a table showing the relation between the enable/disable settings and one example of the authentication method on the digital multi-function peripheral shown in FIG. 1;

FIG. 10 is a flowchart showing one example of the authentication switching process on the digital multi-function peripheral of the second embodiment;

FIG. 11 is a table showing the relation between the degree of the security level and one example of the authentication method of the digital multi-function peripheral of the second embodiment;

FIG. 12 is a flowchart showing one example of the authentication switching process on the digital multi-function peripheral of the third embodiment;

FIG. 13 is a table showing the relation between the function limiting and one example of the authentication method of the digital multi-function peripheral of the third embodiment.

DESCRIPTION OF THE PREFERRED EMBODIMENTS

The present invention is next described in more detail by way of the accompanying drawings.

The following embodiments are merely specific examples of the present invention and are not intended to limit the technical scope of the present invention.

First Embodiment

The digital multi-function peripheral 1 of one embodiment of the image forming device of the present invention is described next based on FIGS. 1 and 2.

Figure 1:
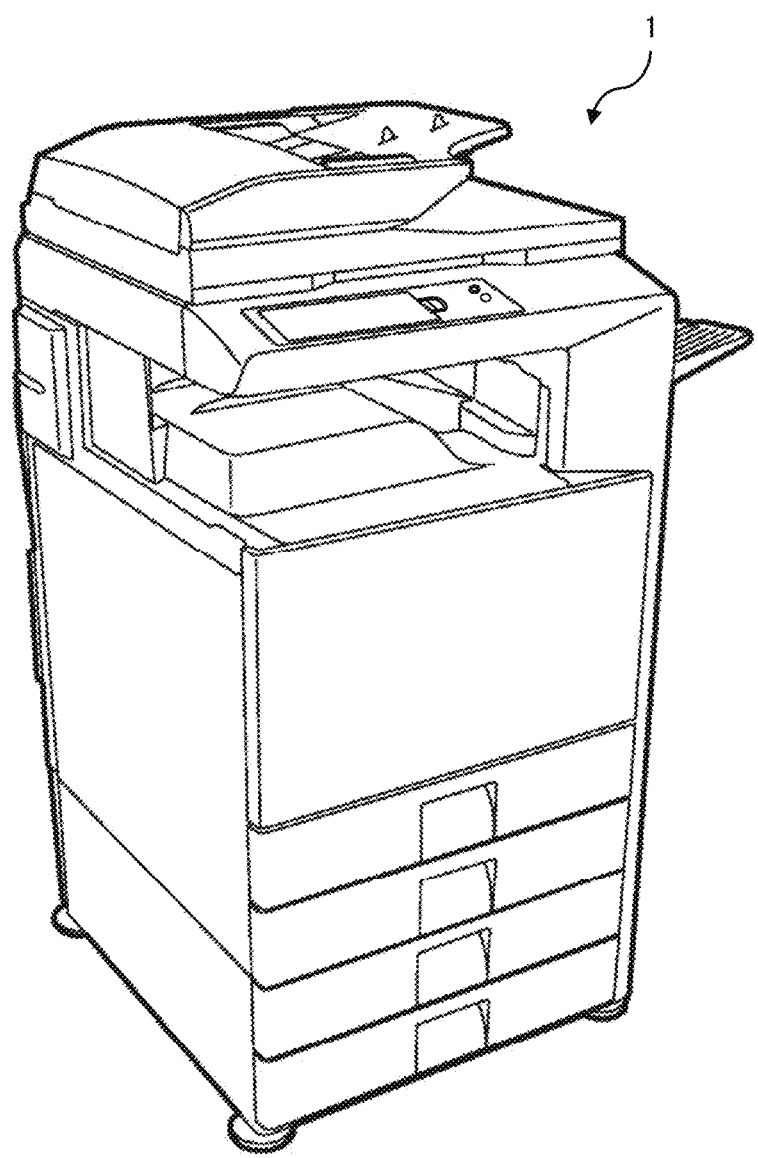
FIG. 1 is a perspective view show ing the external appearance of a digital multi-function peripheral (also digital MFP) of the first embodiment of the present invention.

FIG. 1 is a perspective view showing an external view of the digital multi-function peripheral 1 of the first embodiment of the present invention. FIG. 2 is a block diagram showing the overall structure of the digital multi-function peripheral 1 shown in FIG. 1.

The present invention is not limited to the digital multi-function peripheral 1 and may be applied to all devices having login functions.

The digital multi-function peripheral 1 is a device such as a multi-function peripheral (MFP) including an image data digital processing function, copy and scanning functions, and facsimile functions.

The digital multi-function peripheral 1 also performs jobs including such as scanning, printing, copying or image transmission (Scan to Email, Scan to Ftp) based on instructions from the user accepted by way of the input portion 172 or the communicator 15.

Figure 2:
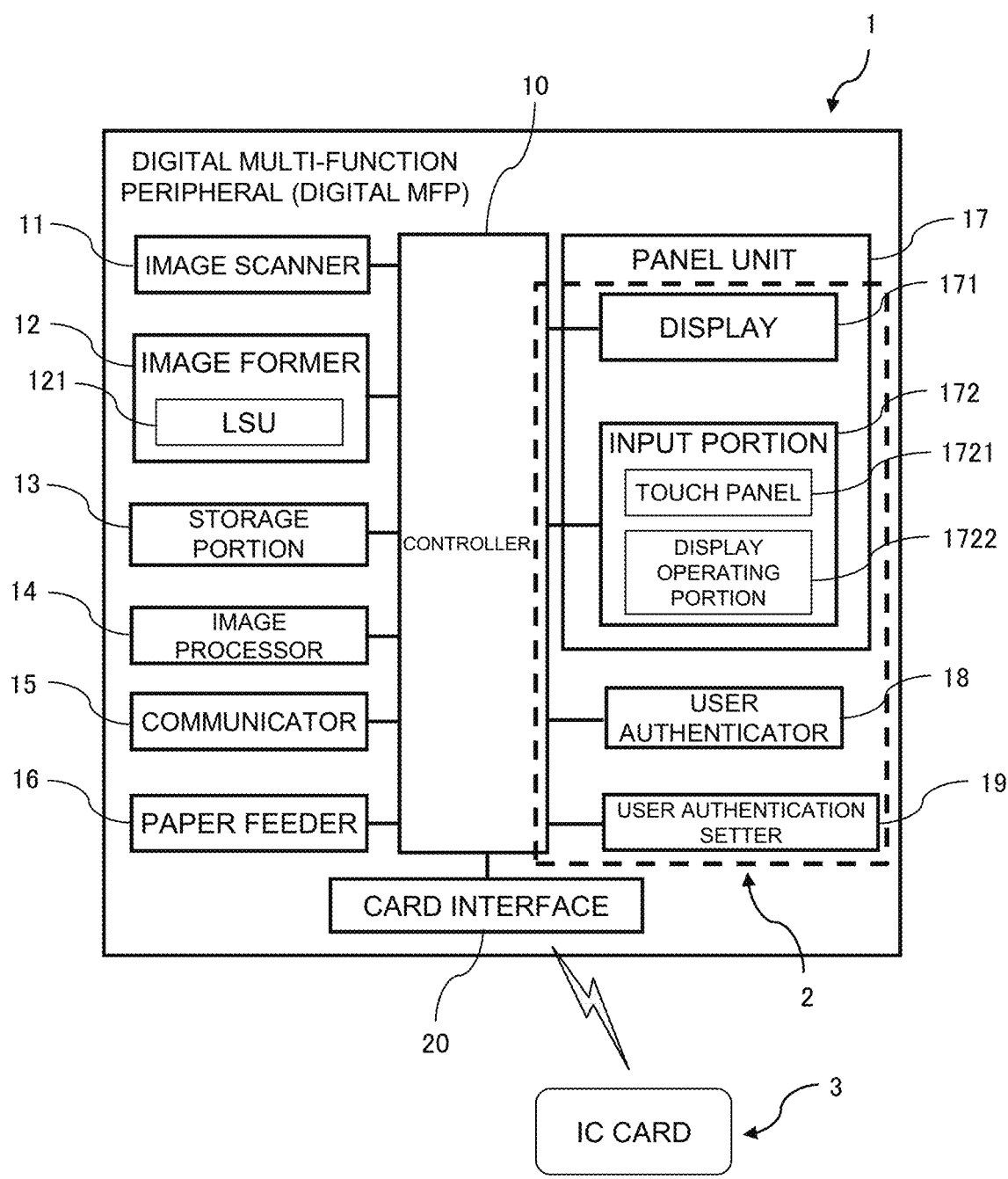
FIG. 2 is a block diagram showing the overall structure of the digital multi-function peripheral shown in FIG. 1.

As shown in FIG. 2, the digital multi-function peripheral 1 contains such as a controller 10, an image scanner 11, an image former 12, a storage portion 13, an image processor 14, a communicator 15, a paper feeder 16, a panel unit 17, a user authenticator 18, a user authentication setter 19, and a card interface 20.

The "user authentication device" (user authentication device 2) of the present invention is implemented by joint operation with the display 171, the input portion 172, the user authenticator 18, the user authentication setter 19, and the controller 10.

Also, the "user function limiter" is achieved by the controller 10.

In the first embodiment, the user authentication device 2 shares a portion of the structural elements of the digital multi-function peripheral 1, however, the user authentication device 2 can be a device with structural elements independent of the digital multi-function peripheral 1.

Each structural element of the digital multi-function peripheral 1 is described next.

The controller 10 integrally controls the digital multi-function peripheral 1 and includes a central processing unit (CPU), a random access memory (RAM), a read only memory (ROM), and a various interface circuits, etc.

The controller 10 monitors and controls various loads such as detection of each sensor, a motor, a clutch, and a panel unit 17 in order to control the overall operation of the digital multi-function peripheral 1.

The image scanner 11 is a part that detects and scans text on a text stand and text sent from a text tray and generates image data, or is a part that acquires image data generated by an external information processor (not shown in drawing) or a facsimile device (not shown in drawing), etc.

When acquiring image data from an external information processor etc., the image data may be acquired by cable or by a wireless network, or the image data stored on a USB etc. may be acquired, or the image data by a combination of the above items may be acquired.

The image former 12 is a part that prints out the image data generated by the image processor 14 on paper, and includes the LSU121.

The LSU121 is a device that irradiates a laser beam corresponding to image information that is a digital signal acquired by the image scanner 11 onto the surface of a photosensitive drum in a charged state to form an electrostatic latent image.

The storage portion 13 is an element or a storage medium that stores such as information or control programs necessary for achieving each function of the digital multi-function peripheral 1. The storage portion 13 may utilize a storage medium, such as a semiconductor element, for example, a ROM, a RAM, a hard disk, a flash storage, a solid state drive (SSD), etc.

The program and the data may be held in different devices such that the area for holding data is a hard disk drive and the area for holding a program is a flash storage.

The image processor 14 is a part that converts the text image scanned by the image scanner 11 into an appropriate electrical signal, generates image data, and processes the image data input from the image scanner 11, into an appropriate enlarged or reduced output in compliance with instructions from the input portion 172.

The communicator 15 communicates by way of a network, etc. with a computer or portable information terminal, external information processor or facsimile device, etc., and is a part that sends and receives various information such as electronic mail or facsimiles to and from the external communication device.

The paper feeder 16 is a portion that conveys a sheet stored in a paper cassette and manual feed tray to the image former 12.

The panel unit 17 includes a display 171 and an input portion 172.

The display 171 is a part that displays various information. The display 171 is for example, a CRT display, a liquid crystal display, or an EL display, etc. The display 171 is a display device such as for line displays and monitors for displaying electronic data such as the processing status of application software and operating systems. The controller 10 displays the operation and status of the digital multi-function peripheral 1 by way of the display 171.

The input portion 172 includes a touch panel 1721 and a display operating portion 1722, and is a portion that accepts inputs (instructions) from the user.

The user authenticator 18 is a part that identifies whether or not the applicable user is a genuine user by comparing the corresponding information prerecorded in the storage portion 13, with information such as login names and passwords entered from the input portion 172, the icon image selected by way of the input portion 172, and the user ID scanned from the user's IC 3 card by way of the card interface 20.

Also, the user authenticator 18 authenticates the user according to an authentication method selected by the user from among a predetermined plurality of authentication methods such as IC card authentication, login authentication of the user, and quick authentication.

Figure 4:
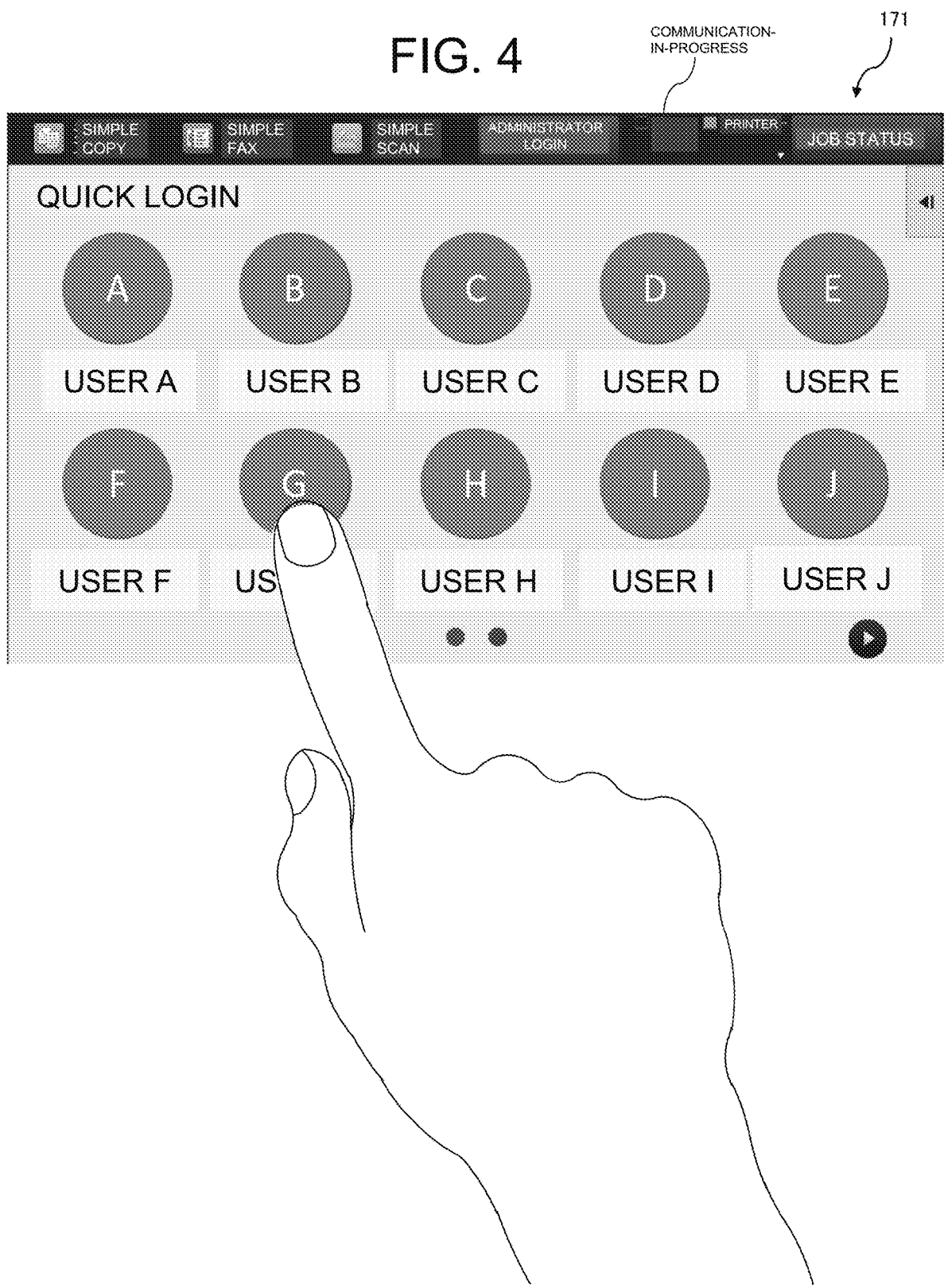
FIG. 4 is an explanatory drawing showing an example of the quick authentication screen on the digital multi-function peripheral shown in FIG. 1.

Quick authentication is an authentication method that simplifies the normal login authentication that requests a login name (or account) and a password. As shown in FIG. 4, quick authentication is an authentication method capable of login just by selecting the icon of the applicable user.

Quick authentication is an authentication method that unlike login authentication, does not require setting a login name and a password and therefore is an effective authentication method that allows the user to easily login, for example, when a quick login is needed such as during business trips.

Quick authentication is also convenient since each individual's settings can be quickly retrieved.

The plurality of authentication methods can be an authentication method including any combination of optional inputs among inputs relating to selecting icon images, input of login names, input of passwords and input of IC cards.

The user authentication setter 19 is a part that enables or disables each authentication method.

The card interface 20 is a part that scans the IC card 3 of the user who has recorded the user ID, etc.

The card interface 20 utilizes for example, near field communication (NFC) as the read-write method.

NFC is a short distance wireless communication standard for the 13.56 MHz band. NFC is approved by the International Standards Organization (ISO) as a next-generation standard for radio frequency identifier (RFID) technology (integrated circuit (IC) card/IC tag).

Communication protocol examples include ISO 14443 Type A, B, FeliCa (registered trademark) and ISO 15693, etc.

The present invention is not limited to the non-contact type read method, and a contact type read method may be used.

The digital multi-function peripheral 1 may include a biometric feature input part that inputs biometric features of the user such as a fingerprint, a face, an iris, and voiceprint.

The digital multi-function peripheral 1 can also be made capable of inputting user information including the user ID from the user's portable terminal by way of the communicator 15.

One example of quick authentication login process on digital multi-function peripheral 1 according to the first embodiment of the present invention One example of the quick authentication login process on the digital multi-function peripheral 1 according to the first embodiment of the present invention is describe next based on FIG. 3 through FIG. 9.

Figure 3:
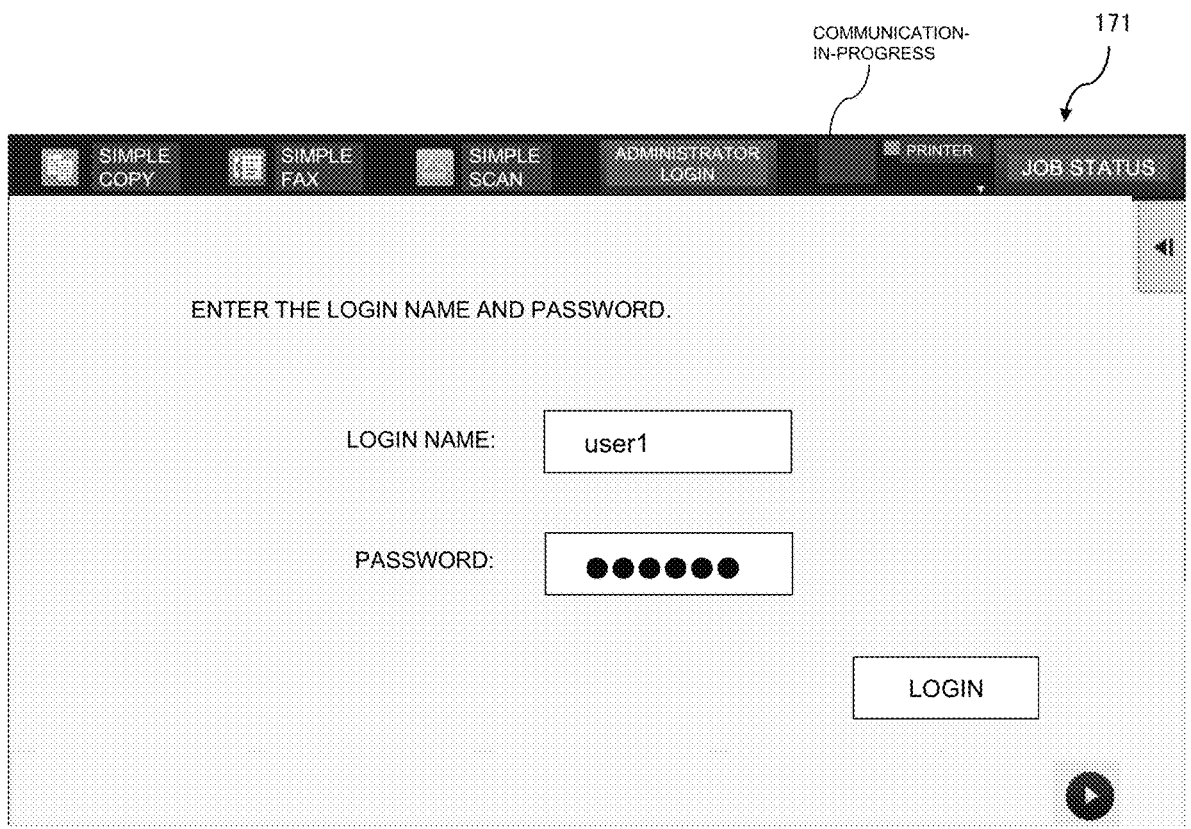
FIG. 3 is an explanatory drawing showing an example of a login screen on the digital multi-function peripheral shown in FIG. 1.
Figure 5:
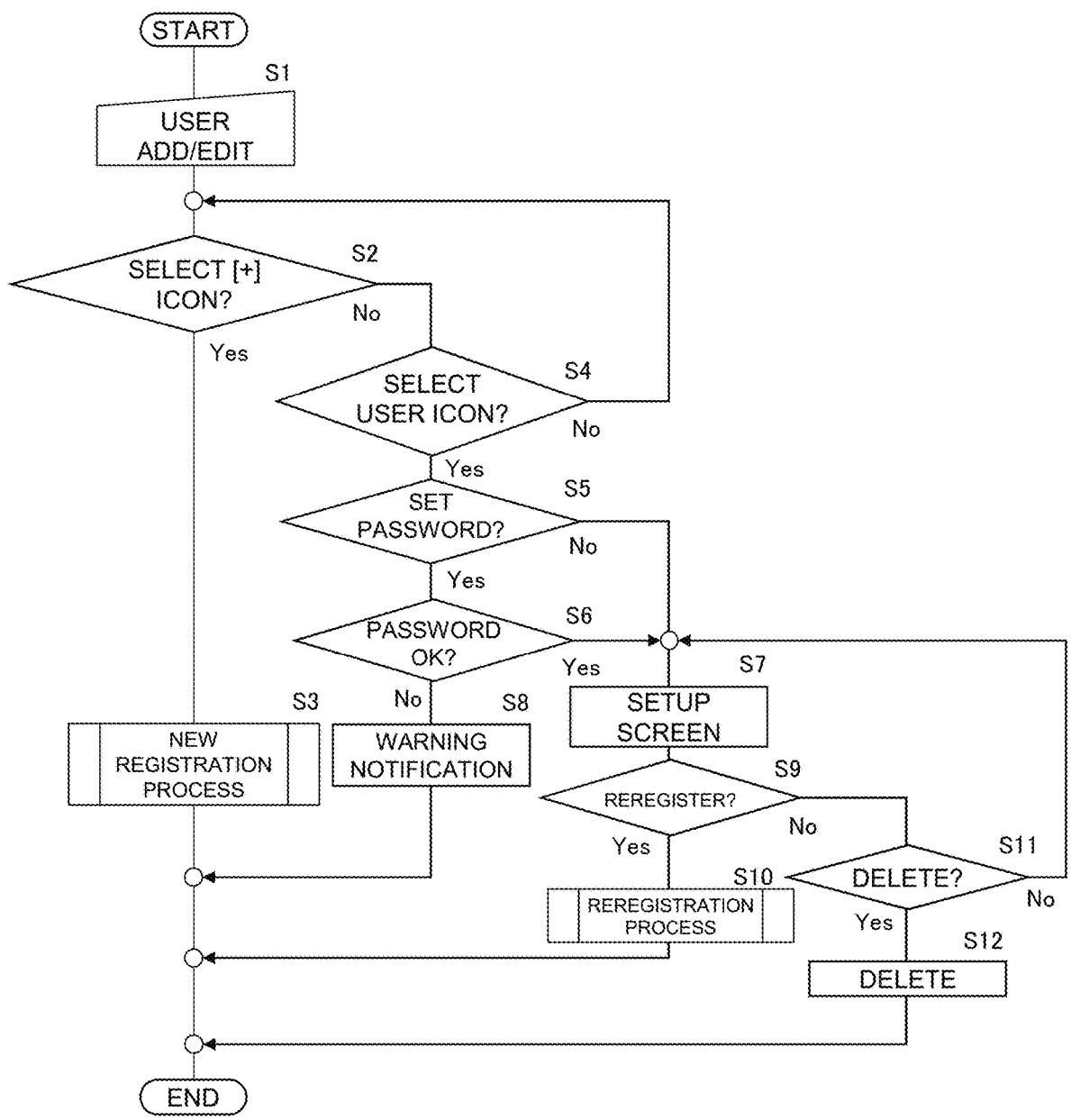
FIG. 5 is a flowchart showing an example of the user registration process for quick authentication on the digital multi-function peripheral shown in FIG. 1.
Figure 6:
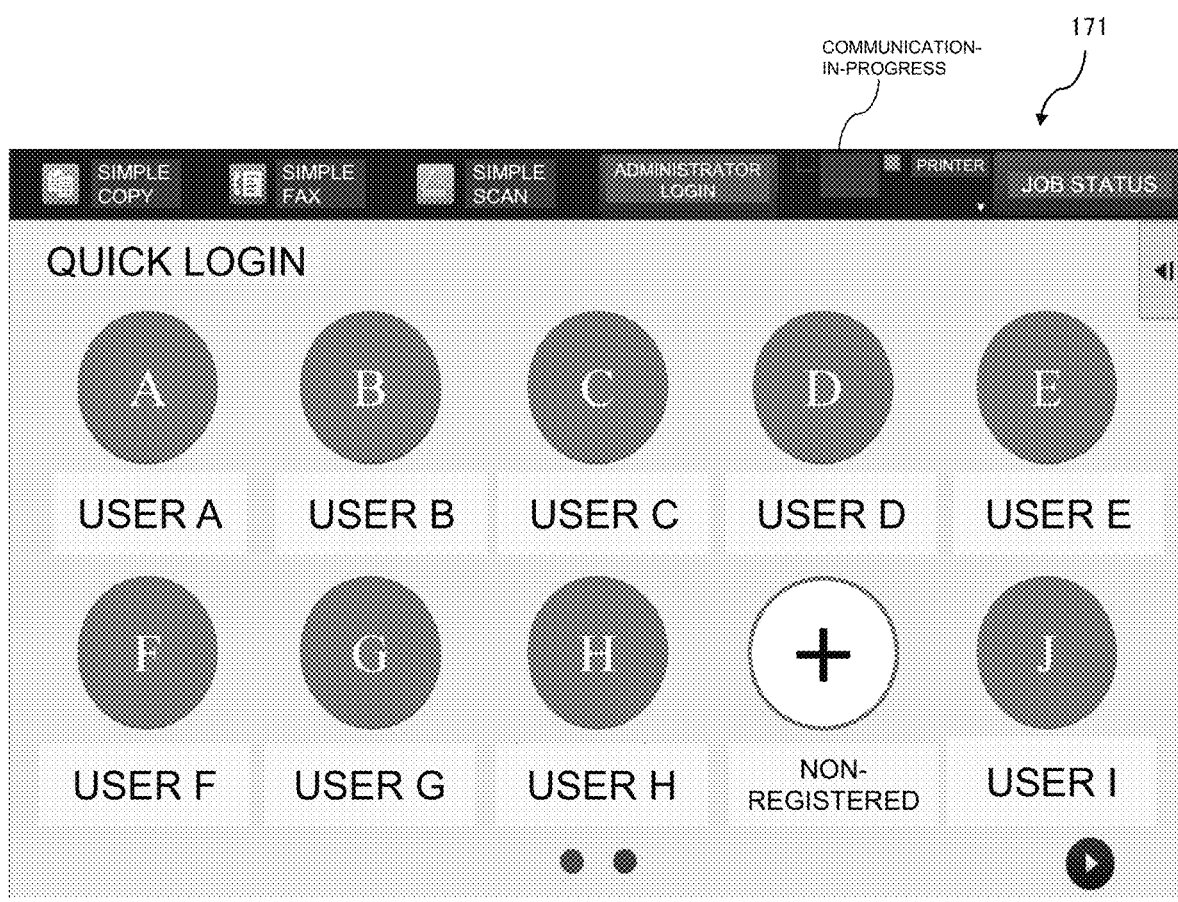
FIG. 6 is an explanatory drawing showing another example of the quick authentication screen on the digital multi-function peripheral shown in FIG. 1.

FIG. 3 is an explanatory drawing showing one example of a login screen on the digital multi-function peripheral 1 shown in FIG. 1. FIG. 4 is an explanatory drawing showing one example of a quick authentication screen on the digital multi-function peripheral 1 shown in FIG. 1. FIG. 5 is a flowchart showing one example of the user registration process for quick authentication by the digital multi-function peripheral 1 shown in FIG. 1. Further, FIG. 6 is an explanatory drawing showing another example of the quick authentication screen by the digital multi-function peripheral 1 shown in FIG. 1. FIG. 7 is a flowchart showing one example of a login process for quick authentication by the digital multi-function peripheral 1 shown in FIG. 1. Further, FIG. 8 is a flowchart showing one example of the process when enabling a single authentication by the digital multi-function peripheral 1 shown in FIG. 1. FIG. 9 is a table showing an example of the relation between one example of the authentication method of the digital multi-function peripheral 1 shown in FIG. 1 and the enable/disable setting.

FIG. 3 shows one example of the normal login screen.

The message "Please enter a login name and a password." appears on the display 171 in the login screen as shown in FIG. 3, and a login name and a password entry form and a login icon are displayed.

When the user enters the login name and the password and touches the login icon, the user authenticator 18 compares the entered login name and the entered password with the login name and the password stored in the storage portion 13 and when the login names and the passwords match, the user authenticator 18 authenticates the applicable user as the genuine user.

Next, FIG. 4 shows one example of the quick authentication screen.

As shown in FIG. 4, the icon images A through J corresponding to each of the users A through J, are displayed as a quick authentication screen on the display 171.

The login operation is simple and is also convenient because the individual settings can be quickly retrieved since the user can login by just selecting the icon image corresponding to the user's icon (icon image G in the example of FIG. 4).

The user registration process for quick login is described next while referring to FIG. 5.

In step S1 in FIG. 5, when the input portion 172 accepts the add/edit command from the user (step S1), the controller 10 judges in step S2 whether or not a [+] icon showing the addition of a non-registered user is selected (step S2).

Next in step S2, when the [+] icon is selected, or namely when addition of a non-registered user is selected (when judgement in step S2 is Yes), the controller 10 performs the new registration process for the user in step S3 (step S3).

The controller 10 afterwards ends the process.

As shown in FIG. 6, a non-registered icon is displayed for a user with a [+] icon.

The user performs the new registration process by selecting the applicable the [+] icon.

In step S2 of FIG. 5 on the other hand, when no [+] icon is selected, or namely, when user edit is selected (when judgement in step S2 is No) the controller 10 performs a judgement (whether user icon is selected) in step S4 (step S4).

In FIG. 6, user edit processing is performed when a user icon A through I is selected.

Next, in step S4 of FIG. 5, the controller 10 judges whether or not the user icon is selected (step S4).

When a user icon is selected (when judgement in step S4 is Yes), the controller 10 performs a judgement in step S5 (step S5).

However, when a user icon is not selected (when judgement in step S4 is No), the controller 10 returns the process to step S2 (step S2).

Next, in step S5, when a password is set, (when judgement in step S5 is Yes), the controller 10 performs the judgement in step S6 (step S6).

However, when no password is set in step S5, (when judgement in step S5 is No), the controller 10 performs the process in step S7 (step S7).

Next, in step S6, the controller 10 judges whether or not the password is correctly entered (step S6).

When the password is correctly entered (when judgement in step S6 is YES), the controller 10 performs the process of step S7 (step S7).

However, when the password is not correctly entered, (when judgement in step S6 is No), the controller 10 performs the warning notification in step S8 (step S8). The controller 10 afterwards ends the process.

Next, in step S7, the controller 10 displays a setup screen on the display unit 171 (step S7).

Next in step S9, the controller 10 judges whether or not a reregistration command is accepted by the input portion 172 from the user (step S9).

When the input portion 172 accepts a reregistration command from the user (when judgement in step S9 is Yes), the controller 10 performs the reregistration process of the user (step S10).

The controller 10 afterwards ends the process.

However, when the input portion 172 does not accept a reregistration command from the user (when judgement in step S9 is No), in step S11, the controller 10 judges whether or not the input portion 172 accepts (a command for) deletion of registration from the user (step S11).

When the input portion 172 accepts a registration delete command from the user (when judgement in step S11 is Yes), in step S12, the controller 10 performs deletion of user registration (step S12).

The controller 10 afterwards ends the process.

However, when the input portion 172 does not accept a deletion command for registration from the user (when judgement in step S11 is No), the controller 10 returns the process to step S7 (step S7).

Next, the login process for quick authentication is described while referring to FIG. 7.

In step S21 in FIG. 7, when the user icon is selected on the quick authentication screen (step S21), the controller 10 makes a judgement in step S22 (step S22).

Next, in step S22, the controller 10 judges whether the password is set or not (step S22).

When the password is set (when judgement in step S22 is Yes), the controller 10 performs judgement in step S23 (step S23).

However, when the password is not set (when judgement in step S22 is No), the controller 10 performs login process in step S24 since the login is successful (step S24).

The controller 10 afterwards ends the process.

Next, in step S23, the controller 10 judges whether or not the password that is input is correct (step S23).

When the password that is input is correct (when judgement in step S23 is Yes), the controller 10 performs the process of step S24 since the login is successful (step S24).

On the other hand, when the password that is input is not correct (when judgement in step S23 is No), the controller 10 in step S25 performs the warning notification since the login is a failure (step S25).

The controller 10 afterwards ends the process.

Next, the process of enabling a single authentication method among a plurality of authentication methods is described while referring to FIG. 8.

In step S31 of FIG. 8, when the input portion 172 accepts a command (input) to activate a single authentication method (step S31), the controller 10 in step S32 displays a message on display section 171 notifying that all other authentication methods are disabled (step S32).

Next, in step S33, the controller 10 judges whether or not the input portion 172 has accepted the command to switch authentication methods (step S33).

When the input portion 172 accepts the command to switch authentication methods (when judgement in step S33 is Yes), the controller 10 in step S34 switches the authentication method (step S34).

Next in step S35, the controller 10 disables all the other authentication methods (step S35).

The controller 10 afterwards ends the process.

As shown in FIG. 9, the four types of authentication methods 1 to 4 are assumed to be set here.

The authentication method 1 is quick authentication that requires selection of an icon image (and also entry of a password when a password is set).

The authentication method 2 is login authentication that requires entry of a login name and a password.

The authentication method 3 is IC card authentication that requires input of an IC card 3.

The authentication method 4 is biometric authentication that requires input of a biometric feature.

Here, when enabling the authentication method 1, all the other authentication methods 2 through 4 are disabled.

Also, when enabling the authentication method 2, all the other authentication methods 1, 3 and 4 are disabled.

However, in step S33 in FIG. 8, when the input portion 172 does not accept a command to switch the authentication methods (when judgement in step S33 is No), the controller 10 returns the process to step S31 (step S31).

In this way, during switching to other authentication methods, by switching to the appropriate authentication method after notifying the user, a digital multi-function peripheral 1 can be achieved that is capable of reducing user operating errors and preventing a drop in security.

Second Embodiment

Next, a digital multi-function peripheral 1 according to a second embodiment of the present invention will be described while referring to FIGS. 10 and 11.

FIG. 10 is a flow chart showing an example of authentication switching process by the digital multi-function peripheral 1 according to the second embodiment of the present invention. FIG. 11 is a table showing the relation between the degree of security level and the authentication method examples for the digital multi-function peripheral 1 according to the second embodiment.

The processes in steps S41 and steps S43 to S46 in FIG. 10 respectively correspond to the processes in steps S31 to S35 in FIG. 8 of the first embodiment so a corresponding description is omitted.

An explanation of the judgement in step S42 not described in FIG. 8 is given next.

In step S41 of FIG. 10, when the input portion 172 accepts a command to enable the single authentication method (step S41), the controller 10 in step S42 judges whether or not the security drops due to switching the applicable authentication method (step S42).

Specifically, as shown in FIG. 11, the degree of the security level is set beforehand according to each authentication method and is stored in the storage portion 13.

In FIG. 11, the four types of authentication methods 1 to 4 are set as the authentication methods.

Each authentication method and the degree of the security level for the authentication method will be described below while referring to FIG. 11.

The authentication method 1 is a quick authentication that requires input relating to selection of an icon image (also entry of a password when a password is set) and the security level is set to the lowest level 1.

The authentication method 2 is login authentication that requires entry of a login name and a password, and the security level is set to 2.

The authentication method 3 is an IC card authentication that requires input of the IC card 3, and the security level is set to 3.

The authentication method 4 is biometric authentication that requires input of a biometric feature, and the security level is set to the highest level 4.

Also, for example, even when performing the same quick authentication, when a password request is set, the security level may be set higher compared to when no password request is set.

The controller 10 determines whether or not the security level drops due to switching the authentication method, by referring to the security level of each authentication method stored in the storage portion 13.

When the security level drops (when judgement in step S42 is Yes), the controller 10 in step S43 displays a message on the display 171 to disable all other authentication methods (step S43).

However, when there is no drop in security level (when judgement in step S42 is No), the controller 10 in step S45 switches the authentication method (step S45).

In this way, by notifying the user when switching to an authentication method with a low level of security, a digital multi-function peripheral 1 can be achieved that is capable of reducing user operating errors when there is a plurality of authentication methods.

Variations

As a variation of the second embodiment, when switching to an authentication method with a low security level, the controller 10 may display an approval button and a message on the display 171 indicating the switching to an authentication method with a low level of security.

When the input portion 172 accepts an input indicating that the user approves of switching the authentication method, the controller 10 enables the authentication method by way of the user authentication setter 19.

In this way, when switching the authentication method to an authentication method with a low security level, and notifying the user of switching to an authentication method with a low security level, and by switching to the applicable authentication method when approval from the user is accepted, a digital multi-function peripheral 1 can be achieved that is capable of reducing user operating errors when there are a plurality of authentication methods.

Third Embodiment

A digital multi-function peripheral 1 of the third embodiment of the present invention is described next while referring to FIG. 12 and FIG. 13.

FIG. 12 is a flowchart showing one example of the authentication switching process by the digital multi-function peripheral 1 of the third embodiment. FIG. 13 is a table showing the relation between the function limiting and one example of the authentication method of the digital multi-function peripheral 1 of the third embodiment.

The process in steps S51 to S55 in FIG. 12 corresponds to the process in steps S31 to S35 of FIG. 8 in the first embodiment so a description is omitted.

An explanation of step S56 that is not described in FIG. 8 is given next.

In step S55 of FIG. 12, after disabling all other authentication methods (step S55), the controller 10 performs function limiting according to the single authentication method in the following step S56 (step S56).

Specifically, as shown in FIG. 13, the function limiting is set beforehand according to each authentication method and is stored in the storage portion 13.

In FIG. 13, the four types of the authentication methods 1 to 4 are set as the authentication method.

Each authentication method and the function limiting for each authentication method are described below based on FIG. 13.

The authentication method 1 is a quick authentication that requires input relating to selection of an icon image (and also password input if a password is set). The function limiting sets three function limits which are limiting the number of printed sheets, prohibiting color printing, and prohibiting use of options.

Example of the available options include finishing (post-processing) such as punching (hole punching), stapling (binding) a plurality of pages of a manuscript together, and sorting.

The authentication method 2 is login authentication that requires entry of a login name and a password. Function limiting is set for the two functions of prohibiting color printing and prohibiting options.

The authentication method 3 is IC card authentication that requires input of an IC card 3. The function limiting sets for the one function of prohibiting use of options.

The authentication method 4 is biometric authentication that requires input of a biometric feature. There is no function limiting.

Also, the limit on the number of printed sheets can be changed, for example, according to the authentication method. For example, authentication method 1 can be set up to 10 sheets per month, authentication method 2 for up to 20 sheets per month, authentication method 3 for up to 30 sheets per month, and authentication method 4 for an unlimited number of printed sheets.

The controller 10 performs the function limiting while referring to the function limiting on each authentication method in the storage portion 13.

In this way, a digital multi-function peripheral 1 can be achieved that reduces user operating errors when there are a plurality of authentication methods and when functions are limited according to the authentication method.

First Variation

As a first variation of the third embodiment, for example, when authenticating by authentication method 1, the display 171 may show the user screens that differ according to the authentication method such as not displaying the color printing button (or displaying as a gray area).

In this way, merely glancing at the user screen shows what functions are available, so that a digital multi-function peripheral 1 can be achieved that reduces user operating errors when there are a plurality of authentication methods and when function are limited according to the authentication methods.

Second Variation

As a second variation of the third embodiment, in step S52, when displaying the authentication switching on the display 171 (step S52), a list of functions showing limits that are added (or removed) may be displayed on the display 171.

Also, an icon to be added (or removed) due to addition (or removal) of function limiting may be temporarily displayed on the display 171 screen.

In this way, merely glancing at the user screen shows what functions are available (or not available) by authentication switching, so that a digital multi-function peripheral 1 can be achieved that reduces user operating errors when there are a plurality of authentication methods and when functions are limited according to the authentication methods.

The preferred embodiments of the present invention may also include combinations of any of the above-mentioned embodiments. In addition to the embodiments described above, various modifications of the present invention are possible that should not be construed as within the scope of the present invention. The present invention may encompass items equivalent in meaning to the range of the aspects and includes all variations within the stated range.

What is claimed is:

1. A user authentication device comprising:
   a user authentication setter that enables or disables a predetermined plurality of authentication methods;
   a user authenticator that accepts user authentication by an authentication method that the user authentication setter enables;
   a display that displays various information to a user;
   a processor; and
   a computer-readable medium storing instructions that, when executed by the processor, cause the processor to control the user authentication setter, the user authenticator, and the display,
   wherein, when the user authentication setter accepts a setting that enables a single authentication method among the plurality of authentication methods, the processor controls the user authentication setter to disable all authentication methods other than the single authentication method, and the user authenticator accepts only user authentication by the single authentication method, and
   wherein a degree of a security level of each of the plurality of authentication methods is predetermined, and when an input portion accepts an input to enable an authentication method with a security level lower than a security level of a currently enabled authentication method, the processor controls the display to display a notification that a switch is made to an authentication method with a low security level and then the input portion accepts an input to enable the switch of the authentication method, and the processor controls the user authentication setter to enable the authentication method, and
   when the input portion accepts an input to enable an authentication method with a security level not lower than the security level of the currently enabled authentication method, the processor controls the user authentication setter to enable the authentication method without any notification to the user and without requiring any input to enable the switch of the authentication method.

2. The user authentication device according to claim 1, wherein the display switchably displays between user authentication screens relating to the plurality of authentication methods, and
   wherein the processor controls to not display authentication screens relating to the authentication methods other than the single authentication method on the display.

3. The user authentication device according to claim 1, wherein the plurality of authentication methods includes an optional combination of inputs from among an input relating to selecting an icon image, an input of a login name, an input of a password, and an input of an IC card.

4. An image forming device comprising:
   the user authentication device according to claim 1;
   an image processor that processes image data; and
   an image former that forms an image based on the image data processed by the image processor.

5. The user authentication device according to claim 1, further comprising:
   a user function limiter that applies limits, according to the authentication method, on functions that are available after the user authentication, wherein, when displaying authentication switching on the display, the processor controls the display to display a list of functions showing limits that are added or removed, wherein the processor controls the display to temporarily display an icon to be added due to addition of function limiting, and wherein the processor controls the display to temporarily display an icon to be removed due to removal of function limiting.

6. The user authentication device according to claim 5, wherein the display switchably displays between user authentication screens relating to the plurality of authentication methods, and wherein the processor controls to not display authentication screens relating to the authentication methods other than the single authentication method on the display.

7. The user authentication device according to claim 5, wherein the plurality of authentication methods include an optional combination of inputs from among an input relating to selecting an icon image, an input of a login name, an input of a password, and an input of an IC card.

8. An image forming device comprising:

the user authentication device according to claim 5;

an image processor that processes image data; and an image former that forms an image based on the image data processed by the image processor.

* * * * *